(12) United States Patent
Pastrick et al.

(10) Patent No.: US 9,881,521 B2
(45) Date of Patent: Jan. 30, 2018

(54) MANIKIN SENSING PADS AND LINERS IN AN AED TRAINING SYSTEM

(75) Inventors: John J. Pastrick, University Hts., OH (US); Timothy E. Lint, North Royalton, OH (US)

(73) Assignee: PRESTAN PRODUCTS LLC, Mayfield Village, OH (US)

( * ) Notice: Subject to any disclaimer, the term of this patent is extended or adjusted under 35 U.S.C. 154(b) by 994 days.

(21) Appl. No.: 13/352,319

(22) Filed: Jan. 17, 2012

(65) Prior Publication Data

US 2012/0183942 A1 Jul. 19, 2012

Related U.S. Application Data

(60) Provisional application No. 61/433,432, filed on Jan. 17, 2011.

(51) Int. Cl.
G09B 23/28 (2006.01)

(52) U.S. Cl.
CPC .................... *G09B 23/28* (2013.01)

(58) Field of Classification Search
USPC ........................................................ 434/265
See application file for complete search history.

(56) References Cited

U.S. PATENT DOCUMENTS

| | | | | |
|---|---|---|---|---|
| 3,830,229 A | * | 8/1974 | Johnson | 600/392 |
| 4,779,630 A | * | 10/1988 | Scharnberg et al. | 607/142 |
| 5,150,708 A | * | 9/1992 | Brooks | 607/142 |
| 5,275,572 A | * | 1/1994 | Ungs et al. | 434/265 |
| 5,374,195 A | * | 12/1994 | McClanahan | 434/317 |
| 5,885,084 A | | 3/1999 | Pastrick et al. | |
| 5,984,102 A | * | 11/1999 | Tay | 206/701 |
| 6,142,305 A | * | 11/2000 | Sembach | 206/701 |
| 6,272,385 B1 | * | 8/2001 | Bishay et al. | 607/142 |
| 6,736,643 B2 | | 5/2004 | Pastrick et al. | |
| 6,872,080 B2 | | 3/2005 | Pastrick et al. | |
| 6,969,259 B2 | * | 11/2005 | Pastrick et al. | 434/265 |
| RE40,471 E | * | 8/2008 | Groenke et al. | 607/6 |
| 7,822,488 B2 | * | 10/2010 | Jonsen et al. | 607/142 |
| 8,209,008 B2 | * | 6/2012 | Hansen et al. | 607/8 |
| 8,346,375 B2 | * | 1/2013 | Jonsen et al. | 607/142 |
| D675,739 S | * | 2/2013 | McCormack | D24/168 |
| 8,428,751 B2 | * | 4/2013 | Copp-Howland et al. | 607/142 |
| 2003/0036044 A1 | * | 2/2003 | Pastrick et al. | 434/265 |

(Continued)

OTHER PUBLICATIONS

K&J Magnetics "Reed Switches and Hall Effect Sensors", accessed at: https://www.kjmagnetics.com/blog.asp?p=reed-switches-and-hall-effect-sensors (2014).*

*Primary Examiner* — James Hull

(57) ABSTRACT

An improved AED training pad and liner assembly is provided with an electrical lead connection supported on the training pad. The improved training pad has an adhesive surface and a contact surface. The liner has an engagement surface for repeated adhesive engagement with a portion of the training pad adhesive surface during storage of the assembly. The training pad adhesive surface has an electrical switch supported on the adhesive surface and interconnected with the electrical lead connection. The improved liner has a recess positioned for engagement adjacent the electrical switch to prevent activation of the electrical switch by the liner during storage of the assembly when the pad and liner are adhered together.

5 Claims, 6 Drawing Sheets

(56) References Cited

U.S. PATENT DOCUMENTS

| | | |
|---|---|---|
| 2004/0172069 A1* | 9/2004 | Hakala ............................. 607/5 |
| 2004/0199212 A1* | 10/2004 | Fischell et al. ................. 607/32 |
| 2006/0116662 A1* | 6/2006 | McNichols et al. ....... 604/890.1 |
| 2007/0255382 A1* | 11/2007 | Meyer et al. ................. 607/142 |
| 2008/0036740 A1* | 2/2008 | Bracho ........................ 345/163 |
| 2008/0097546 A1* | 4/2008 | Powers et al. ................. 607/36 |
| 2008/0284607 A1* | 11/2008 | Hyoung et al. ............ 340/573.1 |
| 2009/0029332 A1* | 1/2009 | Solosko et al. ............... 434/265 |
| 2009/0035740 A1* | 2/2009 | Reed et al. ................... 434/265 |
| 2009/0320978 A1* | 12/2009 | Martinez ...................... 150/132 |
| 2010/0049266 A1* | 2/2010 | Ochs et al. ...................... 607/5 |
| 2010/0072060 A1* | 3/2010 | Copp-Howland ....... 204/290.05 |
| 2011/0130068 A1* | 6/2011 | Nuttall et al. .................. 446/75 |
| 2011/0130665 A1* | 6/2011 | Bowers ........................ 600/483 |
| 2011/0214686 A1* | 9/2011 | Chavana et al. .................. 134/1 |
| 2012/0100516 A1* | 4/2012 | Iwami et al. ................. 434/265 |

\* cited by examiner

MANIKIN SENSING PADS AND LINERS IN AN AED TRAINING SYSTEM

CROSS-REFERENCE TO RELATED APPLICATIONS

The present application claims priority from, and incorporates herein by reference, the subject matter of U.S. Application Ser. No. 61/433,432 filed Jan. 17, 2011.

FIELD OF INVENTION

An AED (automatic external defibrillator) training device that can automatically detect when its electrode pads are applied to a training manikin, a training pad and liner assembly which training pad detects its use on a training manikin as used with an AED training device and an AED training system for detecting training pad application.

BACKGROUND

AED trainers or AED training devices are devices which simulate clinical AED's. Clinical AED's make use of adhesive pads to deliver the electrical therapy from the AED to a victim in cardiac arrest. The adhesive pads in AED training devices replicate the use of the adhesive pads used in a clinical AED, but do not deliver electrical therapy from the AED training device to the training manikin. Under a training scenario an AED trainer needs to simulate the actions and behavior of a clinical AED in order to provide the proper training to users of a clinical AED. For safety reasons, AED trainers do not have the capacity to delivery electrical therapy. Since AED trainers are used in conjunction with training manikins, and training manikins do not have the electrical impedance characteristics of a real person, AED trainers face the problem of simulating the immediate and proper response that an AED normally provides to a rescue user—which is that upon proper application of the pads to the indicated locations on the manikin or victim, the AED trainer or clinical AED each need to inform the user that the pads are properly placed and the device is ready for electrical therapy delivery. Since there are many varieties of training manikins on the market utilized for AED & CPR (cardio pulmonary resuscitation) training, and most are made of materials that are not electrically conductive (foam, plastic or resin, for example), there is no readily available means to transmit an electrical signal through the manikin once the 2 pads have been placed onto the manikin.

There have been a number of solutions proposed and developed to address this problem, but all involve some type of modification or additional component which is required to be used with the training manikin.

Some of the existing proposals and methods which have been attempted to solve the problem include the following:

Adding an electrically conductive material to the outside surface of the manikin, such that the training pads are able to detect when they come into contact with the manikin surface;

Adding an electrically conductive material to the inside of the manikin just underneath the surface of the manikin skin so an electrical signal can pass through the skin and travel between the 2 locations of the training pads when they are applied to the manikin;

Adding switches to the manikin which can detect the application of the training pads and electrically communicate with the AED trainer; and Having the AED training instructor manually indicate to the AED trainer device using a button or other input means, once the training instructor has observed that the student has applied the training pads to the manikin properly.

Because training or sensing pads used on training manikins (and clinical AED pads used on patients) utilize an adhesive to provide attachment to the manikin (or the patient), each training pad and clinical AED pad is supplied on a storage liner which covers and protects the entire adhesive side or surface of the pad. To use the pad, the user simply peels the pad off the liner and places the pad—with the adhesive surface down—on the manikin. Training pads are typically reused a number of times until their adhesive begins to wear out or wear off. The liners are generally a smooth continuous surface as is the manikin skin, so there is no inherent structure on the pads to distinguish the difference between being mounted or adhered to the liner or being on the training manikin. An electrically conductive material could be added to the liner, which the training pad could sense, but this would not solve the problem since the modified training pad could only detect itself being removed from the liner, and not actually being applied to the manikin, which results in premature activation. Adding a switch to the training pads which can detect the liner on the pad is also not a viable solution since it faces the same problem of premature actuation once it is removed from the liner.

SUMMARY OF THE INVENTION

The present application provides a new approach which requires no modification to the training manikin and which will function with any training manikin. In this application a switch is provided on an improved training pad. The switch detects its location with respect to the liner by either protruding from the adhesive side or surface of the training pad or by the use of a proximity switch to detect its location adjacent the liner. The training pad of the present application may be used in combination with a novel and non-obvious liner, which provides for the normal storage characteristics required for the pads, but which also prevents activation of the mechanical switch of the pad during storage. The preferred switch is located on the underside (adhesive side) of each training pad and, in the case of a protruding switch, is slightly protruding out of the surface of the pad. Because the switch protrudes from the adhesive surface of the training pad, the switch will become depressed when the training pad is applied to the torso portion of a training manikin. In order to store the improved training pad, the novel special mating liner is disclosed which is designed with an opening or a recessed impression, which is larger and deeper than that of the protruding switch, and will be aligned with the switch whenever the pad is placed onto the liner. In the case of a proximity switch, the switch detects its position with respect to the opening or recess in the liner or lack thereof.

The use of the improved pad on the improved liner means that the improved liner is made slightly thicker that the length or height of the protruding switch, such that that the opening, recess or hole is deep enough to receive the switch and thereby prevent activation of the switch. The liner may be generally shaped in a similar manner to the pads but may be slightly larger to insure the pads can be easily aligned with the liner while maintaining alignment of the switch within the recess. That is, the pad, liner and recess or hole are shaped in such a manner that so long as no part of the adhesive pad is extending much beyond the edge of the liner, the switch will be aligned within the recess or hole, and remain in a deactivated, or storage condition.

DETAILED DESCRIPTION

Figure 1:
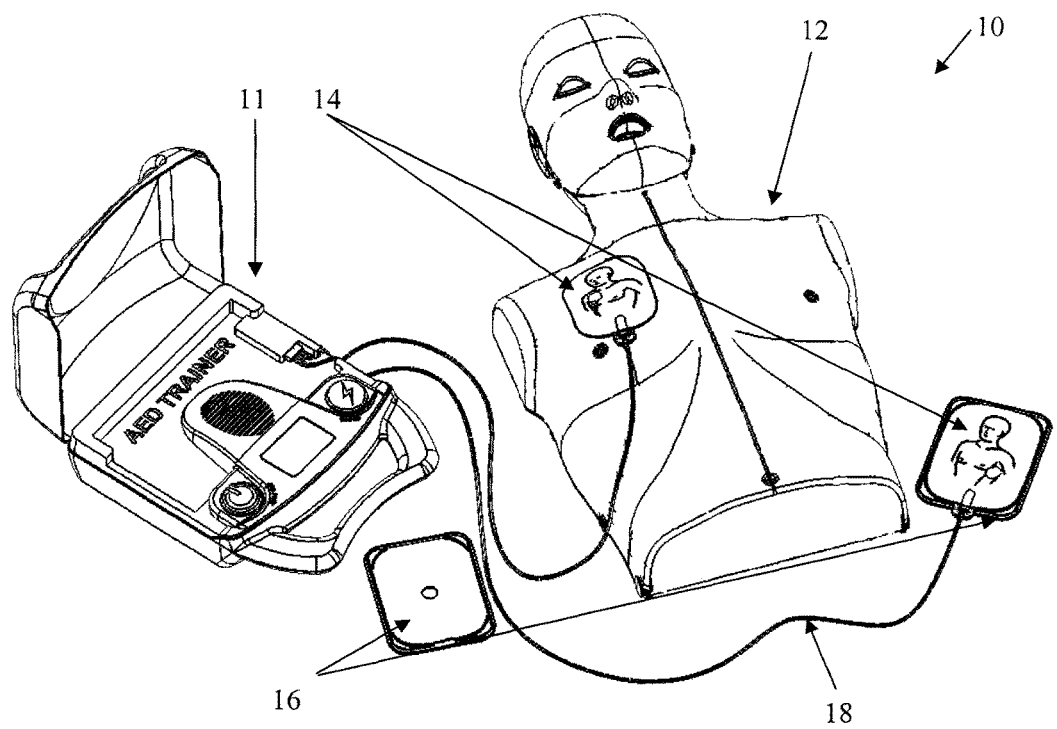
FIG. 1 illustrates an AED training system training having a training manikin with an AED training device, with the AED training device having improved pads and liners. One of the training pads is shown with its liner removed and the pad is attached to the manikin with the electrical lead attached to the AED training device. A second pad with its liner still attached, a pad/liner assembly, is shown ready for removal of the liner.

As illustrated in FIGS. 1-12, embodiments of an improved AED training system 10 having an improved pad 14 and liner 16 assembly 13 of the present application, including an AED training device 11 and training manikin 12, is provided.

During training in the use of AED equipment, a trainer typically teaches use of the equipment to students using an AED training system 10 having an AED training device 11 and a training manikin 12, where one of the tasks the students must perform is proper interconnection of training pads 14 to the AED trainer device 11 and proper application of training pads 14 to the training manikin 12. In this application, an improved training pad 14 and an improved liner 16 are provided, which together form a pad/liner assembly 13. As shown in FIG. 1, an AED training device 11 and manikin 12 have only one of the training pads shown with its liner 16 removed and the pad 14 attached to the manikin 12 and the electrical lead 18 attached to the AED training device 11. A training pad/liner assembly 13 is also shown with its electrical lead 18 attached to the AED training device 11, with the pad 14 ready for removal from the liner 16 prior to attachment to the manikin 12 by the student. The pad 14 of the application is provided with a thin surface layer 20 of adhesive material which enables the pad 14 to stick to the liner 16, until removed by a student or trainer. The adhesive surface layer 20 is of a material such as a pressure sensitive adhesive, which enables easy removal of the pad 14 from the liner 16, as well as reattachment to the liner 16 upon completion of a training session. The pad and liner may be re-adhered together for storage and reuse a number of times prior to their disposal.

Figure 3:
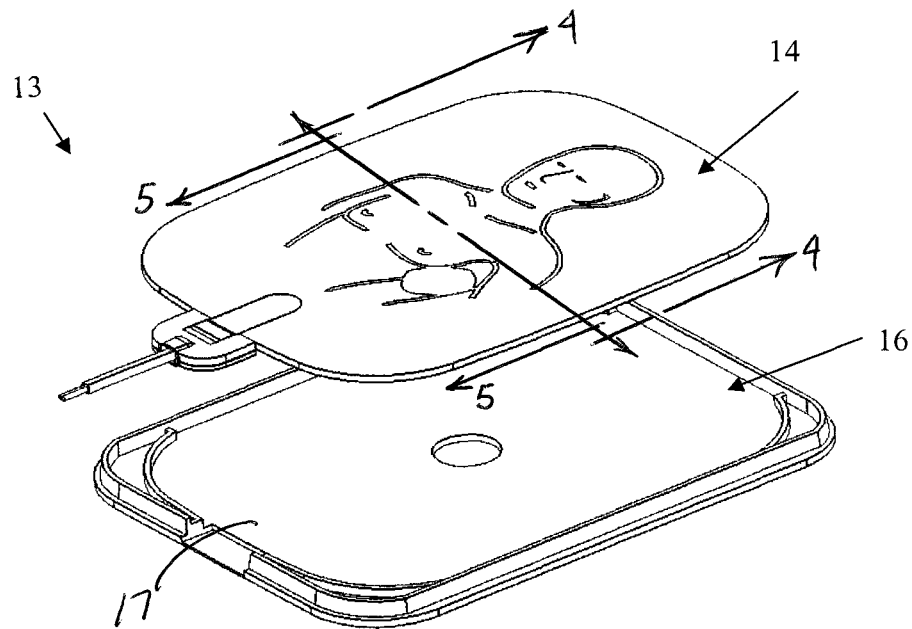
FIG. 3 illustrates an exploded top view of the pad/liner assembly shown in FIG. 2.
Figure 4:
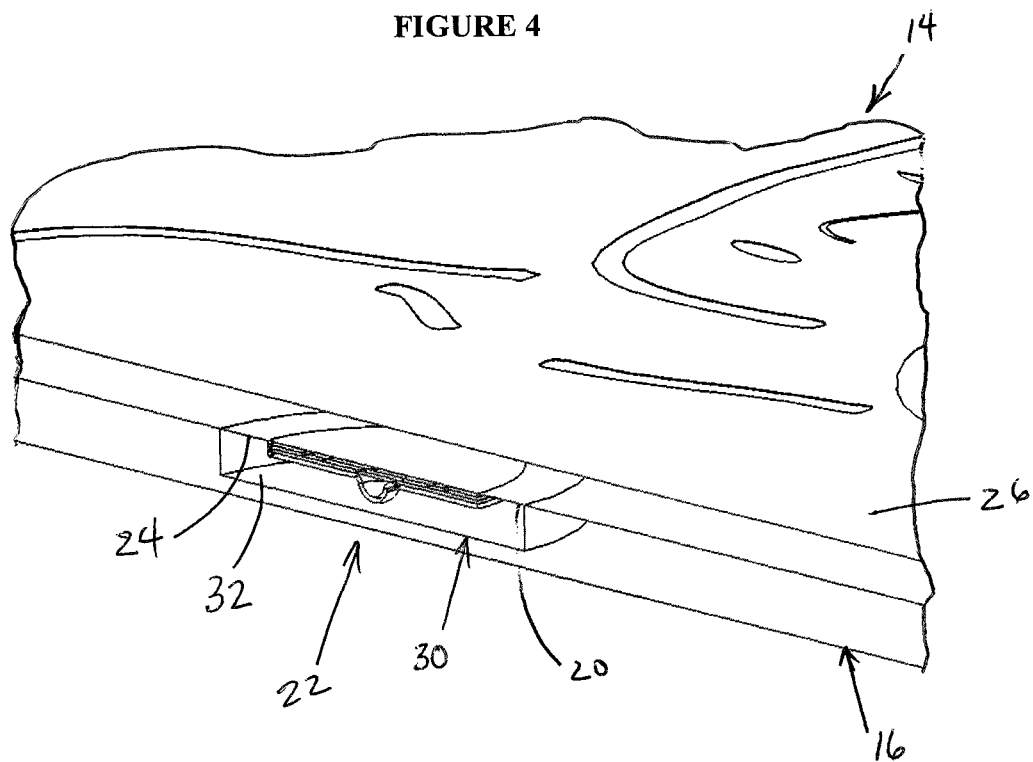
FIG. 4 illustrates a schematic cut-away view of the pad/liner assembly of FIG. 3, taken along the line 4-4 of FIG. 3, and showing the electrical lead of the improved pad, and the switch attached to and protruding from the pad and positioned within the recess of the liner, which liner has a height which is slightly greater than the height of the switch protruding from the adhesive surface of the pad.
Figure 5:
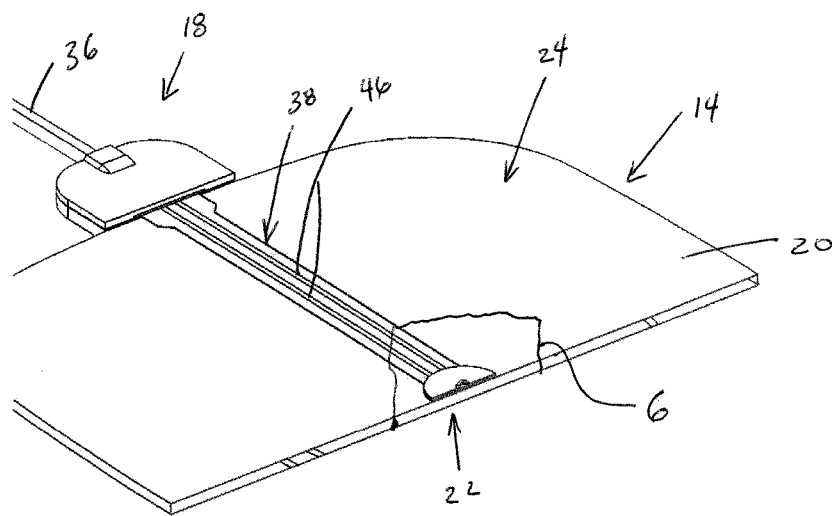
FIG. 5 illustrates a bottom, cut-away view, taken along the line 5-5 of FIG. 3, showing the improved pad and switch with the liner removed.
Figure 6:
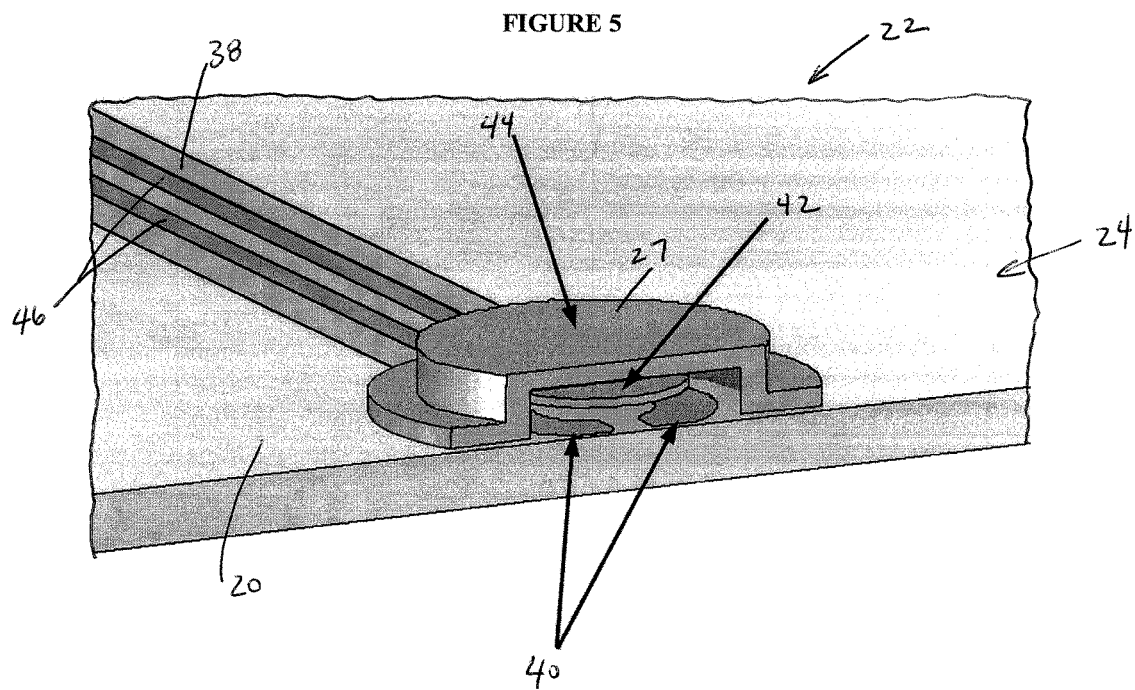
FIG. 6 is a schematic enlarged view of the area indicated as 6 in FIG. 5, showing a close up, cut-away view of the switch and flexible circuit board secured to the adhesive surface of the pad.
Figure 7:
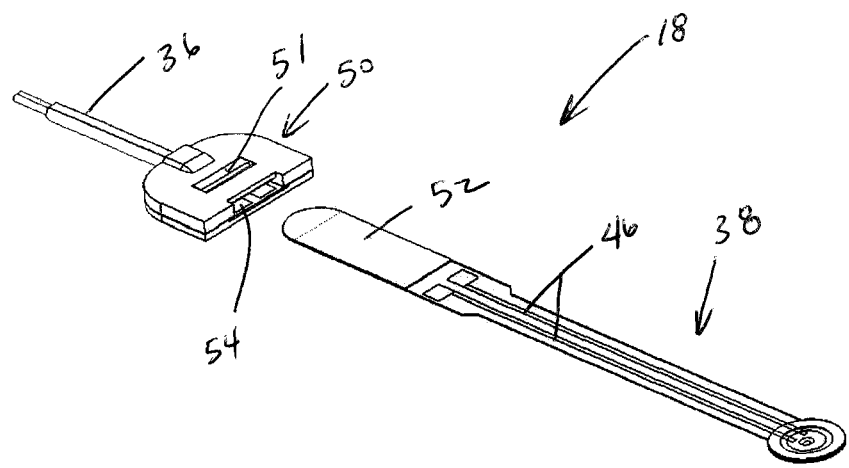
FIG. 7 is an exploded top view of the electrical leads, flexible circuit board and switch to be secured to the adhesive surface of the pad as shown in FIG. 5.
Figure 8:
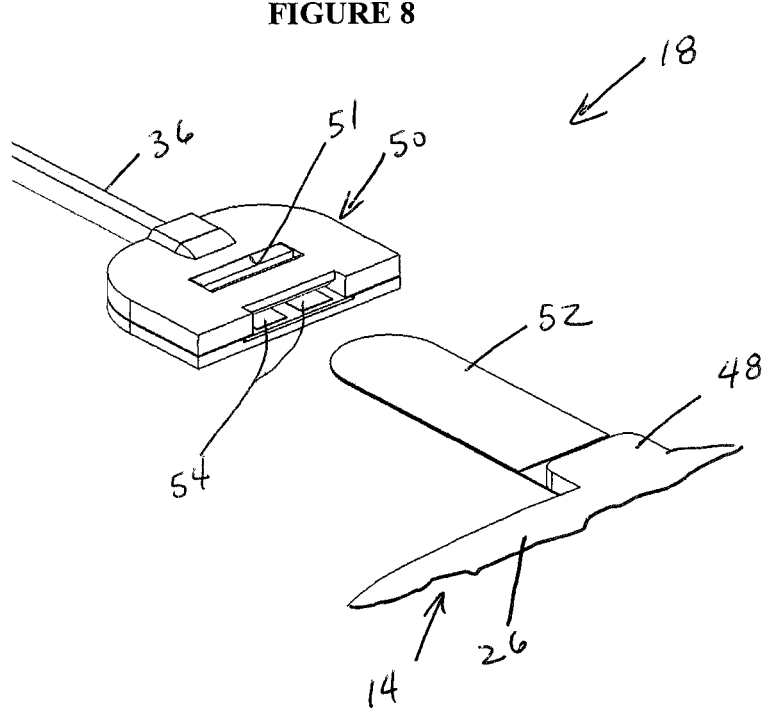
FIG. 8 is an enlarged and exploded top view of the electrical lead and flexible circuit board of FIG. 7 with the secured to the adhesive surface of the pad.

The improved pad shown in various configurations in FIGS. 3 to 12 is preferably provided with a switch 22 which is used to detect the location of the pad with respect to the manikin or the liner. The pad may use, for example, as shown in FIGS. 5 and 6, a switch 22 which protrudes from the adhesive side or surface of 24 the training pad 14 for activation upon engagement with the manikin 12. Alternatively, the pad 14 may use a proximity switch to detect the location of the pad with respect to the liner.

Figure 2:
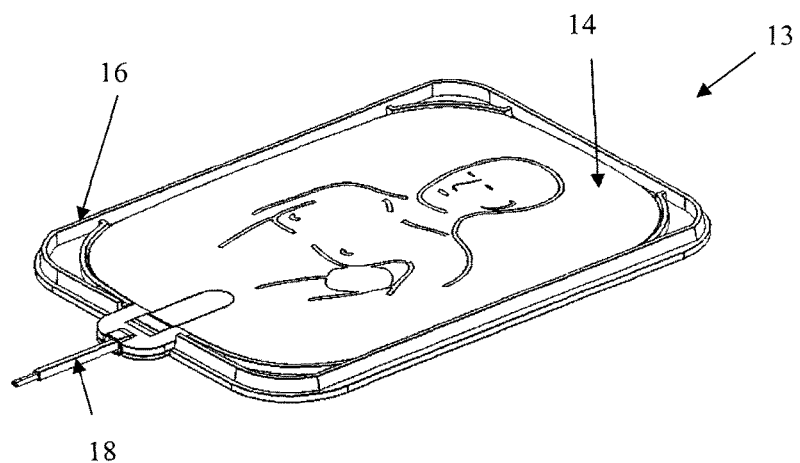
FIG. 2 illustrates a top view of the pad/liner assembly shown in FIG. 1, with the training pad attached to the liner.
Figure 12:
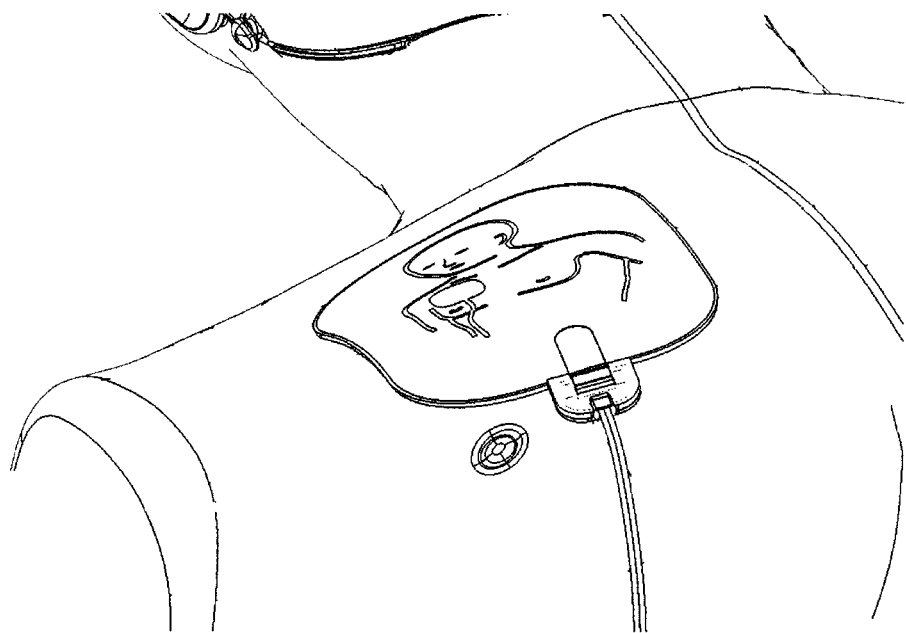
FIG. 12 is a close up view of the conforming pad and electrical lead on a training manikin as shown in FIG. 1.

The training pad 14 of the present application is preferably used in combination with a novel and non-obvious liner 16, such as the pad/liner assembly 13 as shown in FIGS. 2 to 4, which provides for the normal storage characteristics required for the pads, but which also prevents activation of the switch 22 of the pad 14 during storage. The pad 14 is preferably of a low density closed cell foam material. However, any soft comformable material capable of supporting an adhesive material layer may be used. The preferred protruding switch 22 is located on the underside or adhesive side 24 of each training pad and, in the case of a protruding switch as shown in FIGS. 4 to 6, is slightly projecting or protruding out of the adhesive surface 24 of the pad 14. Because the switch 22 protrudes from the adhesive surface 24 of the training pad 14, has an adhesive surface 27 and is also of a compressible material, the switch 22 will become depressed and activated when the training pad 14 is applied to the torso portion of a training manikin 12, as shown in FIGS. 1 and 12. In order to store the improved training pad in a deactivated condition, the novel liner 16 is provided with a mating surface 17 which is designed with a recess 30 which is an opening 31 or a depression 32, which is larger and deeper than that of the protruding switch 22, and will be aligned with the switch 22 whenever the pad 14 is placed onto the liner 16 for storage. As shown in the cut-away view of the pad/liner assembly 13 in FIG. 4, the improved training pad 14 with a protruding switch 22 is adhered to the liner 16, and the mechanical switch 22 of the pad 14 is aligned with the recess 30 or depression 32 within the liner 14. In the case of a pad with a proximity switch, the switch of the pad is similarly aligned and detects its position with respect to the recess 30 or opening 31 in the liner or a lack thereof.

The use of the improved pad 14 with the protruding switch 22 on the improved liner 16 means that the liner is made slightly thicker that the height of the protruding switch 22, such that that the recess 30 is deep enough to receive the switch 22 without touching it, and thereby prevents activation of the switch, as shown in FIG. 4. The liner 16 may be generally similar in shape to the pads but may be slightly larger to insure the pads can be easily aligned with the liner while ensuring that alignment of the switch is maintained within the recess. No specific shape or configuration is required, but the pad, liner and recess are shaped in such a manner that so long as no part of the adhesive pad extends beyond the edge of the liner when the pad and liner are re-adhered, the switch will be aligned within or adjacent the recess, and remain in a deactivated, or storage condition.

The cut-away view of the pad/liner assembly 13 in FIG. 4, shows the switch 22 attached to and protruding from the pad 14 and positioned within the recess 30 of the liner 16. As shown, the liner 16 and the recess 30 have heights which are slightly greater than the height of the switch protruding from the adhesive surface 24 of the pad 14.

Once the liner 16 is removed, as in the bottom cut-away views of FIGS. 5 and 6, the extent to which the switch 22 protrudes from the pad 14 can be readily seen. The electrical lead connector 18 which interconnects the AED trainer device 11 to the pad 14 via wires 36 is attached to the edge of the pad 14, and includes a flexible electronic circuit board 38 arrangement which is secured to the bottom adhesive surface side 24 of the pad 14. The flexible circuit board 38 extends under the protruding switch 22 and terminates in switch contacts 40. A further enlargement of the cut-away view of the flexible circuit board 38 and switch 22 in FIG. 6, shows them secured to the adhesive surface 24 of the pad 14. In FIG. 6, the flexible circuit board 38 is shown to terminate in the switch contacts 40 on the adhesive surface 24 of the pad 14, and positioned adjacent a top contact 42 positioned within the protruding switch housing 44, which is illustrated as being of a compressible soft elastomer material with a top layer of adhesive material for engagement with the training manikin 12. However, the switch housing 44 may be of any material which is able to be compressed into engagement with the training manikin, which is a generally smooth and continuous surface simulating the torso of a human, when the pad 14 is adhered to the manikin 12 by a user or student, as shown in FIGS. 1 and 12.

Figure 9:
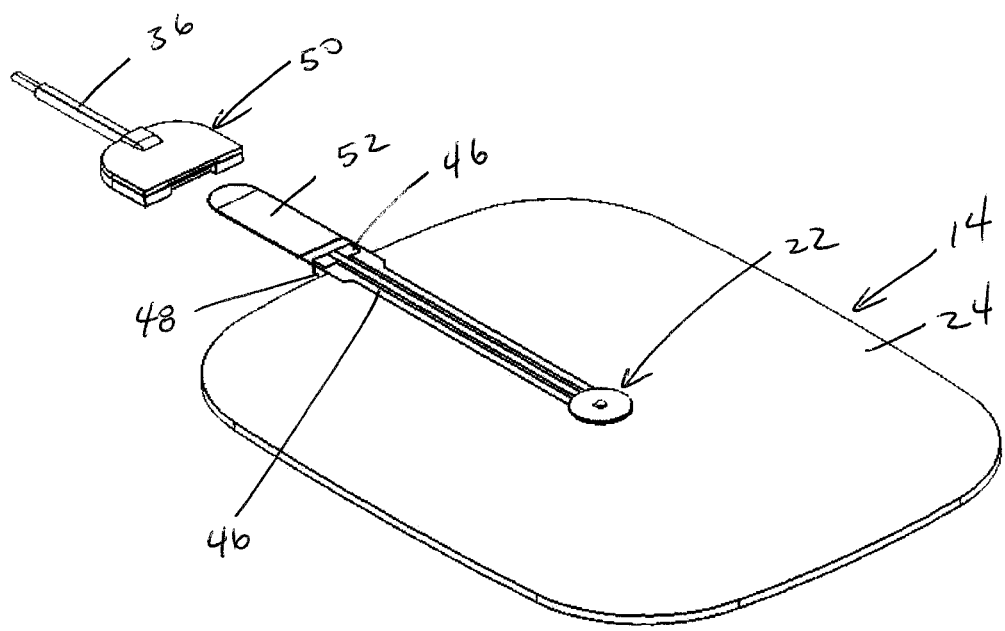
FIG. 9 is an exploded bottom view of the system components of FIG. 8.
Figure 10:
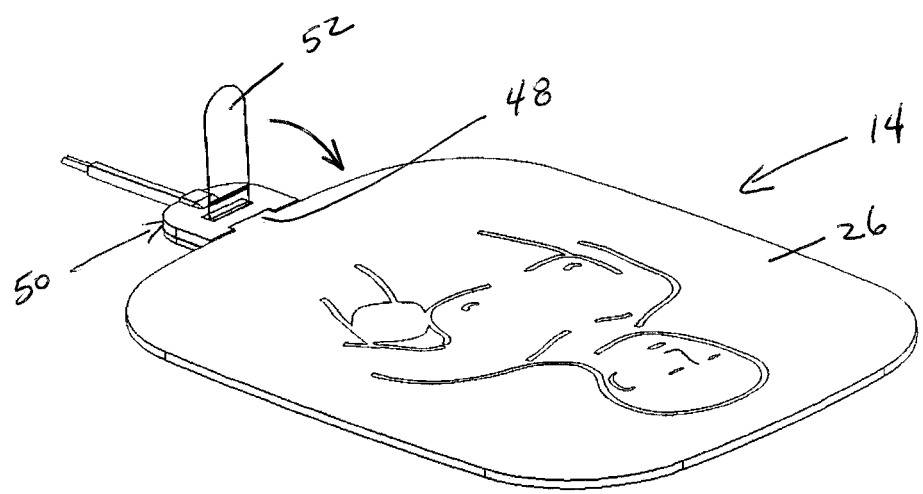
FIG. 10 is an exploded top view of the flexible circuit board and pad engaged with the electrical lead.
Figure 11:
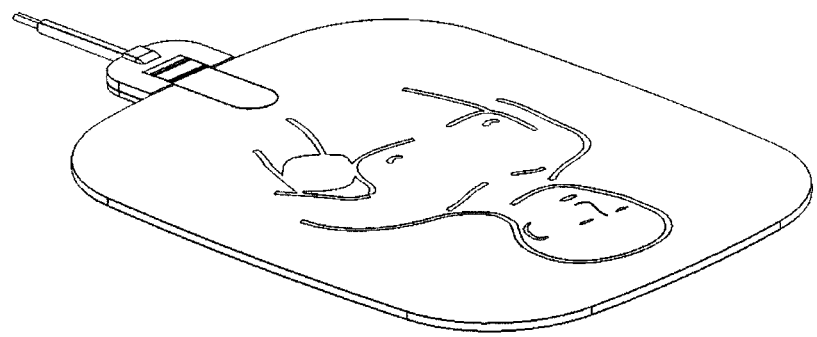
FIG. 11 illustrates a top view of the engaged components of FIG. 10 forming the pad/liner assembly shown in FIG. 2.

During application of the pad 14 to the manikin 12, the compressible soft elastomer material of the switch housing 44 requires the top contact 42 to be engaged with the bottom contacts 40 to complete the electrical circuit via the flexible circuit board 38 and electrical leads 18, to inform the AED training device that the pads 14 are positioned on the manikin 12. It should be understood that the illustrations of FIGS. 5, 6 and 9 are inverted from the actual operating position of the pad, which when adhered to the manikin is in the position shown in FIG. 1.

Additional considerations which further improve the pad and liner assembly 13 of the present application also include the materials from which the pad components and liner are manufactured. The prior art training pads are typically made of a relatively thin plastic or foam material so that they are somewhat pliable in order to conform to the curvature of the training manikin torso. The switch 22 of the improved pad 14 is preferably small enough and/or sufficiently pliable enough itself in order allow this conforming or pliability of the pad. In the illustration of FIGS. 5-11, the elongate flexible circuit board 38 which electrically connects the wires 36 to the switch 22 is of a thin and flexible plastic substrate, for example of polyester, well known in the art, which is screen printed on one surface of the substrate with the desired conductor material in the desired circuit configuration. In the illustrated embodiment of FIGS. 5-7, the conductive material is in two strips 46 and extends to interconnect the electrical wires 36 with the AED trainer 11. On the surface opposing the conductive material strips 46 on the flexible circuit board 38 a layer of adhesive is provided for engagement with the pad 14. The pad 14 is provided with a tab 48 which extends into an electrical lead connector 50. The connector 50 interconnects with electrical lead wires 36 to provide the electrical lead 18 connection to the AED training device 11. Shown in FIGS. 7 and 8, the electrical lead connector 50 is a plastic clip which connects lead wires 36 with the conductive material on the flexible circuit board 38, and has a slot 51 formed through a surface of the clip to receive an end flap 52 of the flexible circuit board 38. An inner surface of the connector clip 50 includes conductive material 54, such that when the end flap 52 passes into the clip and through the slot, the conductive material 46 on the elongate flexible circuit board (shown as transparent in FIG. 7) is press fit by the tab 48 on the pad 14 within the clip 50 into engagement with the conductive material 54 to form an electrical connection. FIG. 9 illustrates a bottom view of the components ready for engagement. To secure the end flap 52 and maintain the electrical connection, the end flap 52 is folded back upon itself and the pad, such that the adhesive surface of the end flap is secured to the contact surface 26 of the pad 14.

Where the switch 22 selected is a protruding style mechanical switch, the switch is easily depressed such that the pad adhesive immediately surrounding the switch contacts and stays adhered to the manikin 14. Such a switch 22 may be pliable, as shown, spring biased or of a rubber material, or other flexible material. The adhesive surface 24 of the pad 14 keeps the switch 22 depressed or compressed until the pads 14 are removed from the manikin 12. Training already requires that the student press firmly on the entire pad contact surface 26 to insure it is in complete and intimate contact with the manikin 12 (or the patient) since this is necessary for the proper electrical therapy to be transmitted during actual use of an AED device.

Other changes to the pad/liner assembly depicted may also be made, since the switch 22 and the recess 30 are shown in the attached figures as located in the center of the liner and the pad, respectively, which allows for the simplest design and for orientation flexibility. However, the switch location is not required to be in the center of the pad and more than one switch could be provided in each pad. Likewise, the shape of the switch and corresponding recess 30 need not be round, but could be of any preferred shape to provide mating engagement.

One problem which is also overcome by the present invention is related to the loss of adhesive material on the adhesive surface 24 of the pad due to repeated reuse. During use in training sessions, it has been found that pad/liner assemblies 13 may be used beyond their preferred lifetime, such that the adhesive surface 27 of the switch 22 on the pad 14 is only fully adhered to the manikin 12 during the application of pressure by the student or user. If the adhesive is sufficiently worn, although the pad may adhere, the switch 22 may not be fully depressed or held in position to activate the AED training device 11 with information regarding continued positioning of the pad 14 on the manikin 12. A still further improvement with the present system is the use of a software logic program instruction in the system of the AED training device 11 which recognizes the initial and proper application of each pad 14 to activate the AED training device 11, and, once each pad is activated, the AED training device ignores further deactivation signals which may be provided if a switch is not adhered or held down, until the training session is completed. Programming of such a software logic program instruction is well known to those of skill in the software design of AED training devices. This improvement extends the life of the pads 14 until the training session is completed and beyond the session.

Although the assembly and devices of the present application have been described in detail sufficient for one of ordinary skill in the art to practice the invention, it should be understood that various changes, substitutions and alterations may be made without departing from the spirit or scope of the system as defined in the attached claims. Moreover, the scope of the present system and devices is not intended to be limited to the specific embodiments described here, which are provided by way of example. As one of ordinary skill in the art will readily appreciate from the disclosure of the present system, devices and embodiments, other systems, components or means, presently existing or later to be developed that perform substantially the same function to achieve substantially the same result as those of the corresponding embodiments described here, may be utilized according to the present application. Accordingly, the appended claims are intended to include within their scope such other systems, devices, components or means.

We claim:

1. An improved automated external defibrillator training pad and liner assembly and an automated external defibrillator training device, the assembly having an electrical lead connection supported on the training pad, the training pad having an adhesive surface and a contact surface, the liner having an engagement surface for repeated adhesive engagement with a portion of the training pad adhesive surface during storage of the assembly, the training pad adhesive surface having an electrical-mechanical switch with a protruding portion protruding from the training pad and interconnected with the electrical lead connection, and the liner having a recess positioned for engagement adjacent the electrical-mechanical switch to prevent the protruding portion of the electrical-mechanical switch from being compressed or depressed by the liner during storage of the assembly;

wherein the protruding portion of the electrical-mechanical switch extends in a direction away from the training pad adhesive surface and out of a plane of the training pad adhesive surface;

wherein the electrical-mechanical switch is depressed for activation of the electrical lead connection when the adhesive surface is adhered to a generally smooth and continuous surface of a training manikin; and wherein the automated external defibrillator training device recognizes an initial and proper adherence of the adhesive surface of the training pad to activate the automated external defibrillator training device, and once activated, the automated external defibrillator training device ignores further deactivation signals from the training pad.

2. The improved automated external defibrillator training pad and liner assembly of claim 1, wherein the recess is an opening in the liner sized for non-interference with the protruding portion of the electrical-mechanical switch during storage of the assembly and the opening through the liner has a height which is larger than a height of the switch supported on the adhesive surface of the pad.

3. The improved automated external defibrillator training pad and liner assembly of claim 1, wherein the recess is a depression formed in the liner sized for non-interference with the electrical-mechanical switch during storage of the assembly and the depression in the liner has a height which is larger than a height of the switch supported on the adhesive surface of the pad.

4. The improved automated external defibrillator training pad and liner assembly of claim 1, wherein the liner is configured for reattachment to the pad to ensure alignment of the electrical-mechanical switch adjacent the recess during storage of the assembly.

5. An improved automated external defibrillator training system, having an automated external defibrillator training device, a training manikin and a training pad having an adhesive surface supporting a protruding switch which switch is activated upon physical contact to depress or compress the protruding switch against the training manikin during adhering of the adhesive surface of the training pad to the training manikin; and wherein the automated external defibrillator training device recognizes an initial and proper adherence of the adhesive surface of each training pad to activate the automated external defibrillator training device, and once activated, the automated external defibrillator training device ignores further deactivation signals from each training pad.

* * * * *